United States Patent Office 3,448,052
Patented June 3, 1969

3,448,052
MAGNETIC CARBON BLACKS
Wolfgang K. F. Otto, Spartanburg, S.C., assignor to Ashland Oil & Refining Company, Houston, Tex., a corporation of Kentucky
No Drawing. Filed Apr. 15, 1965, Ser. No. 448,252
Int. Cl. C04b *35/52;* H01f *1/00;* C09c *1/48*
U.S. Cl. 252—62.51                                    5 Claims

ABSTRACT OF THE DISCLOSURE

Magnetically permeable carbon black is prepared by injecting a feedstock solution of an hydrocarbon oil, an oil soluble heat-decomposable metallo-organic compound of iron, nickel, or cobalt, and an organic salt of barium or aluminum into a burning mixture of an hydrocarbon fuel and an oxygen-bearing gas.

---

This invention relates to the production of carbon black. More particularly it relates to carbon blacks characterized by significant magnetic permeability and improved "wetability" in aqueous and organic liquid media.

Of the various types of carbon blacks now known to persons skilled in the art, furnace carbon blacks are the most widely used. They are useful in a wide variety of applications, especially as pigments and fillers.

Furnace carbon black is produced in highly specialized furnaces, called reactors, wherein a hydrocarbon fuel, such as oil or natural gas, is burned to produce hot combustion gases having a characteristically high temperature, e.g., about 2300° F. or higher. Into these hot combustion gases, a hydrocarbon feedstock is injected. Most commonly, the feedstock is a hydrocarbon oil which is injected into the combustion gases. The feedstock is rapidly dispersed in the combustion gases and is rapidly heated thereby to a temperature at which the feedstock thermally decomposes into carbon, hydrogen, some lower molecular weight hydrocarbons, and, under certain circumstances, small quantities of tarry materials. The resultant mixture of combustion gases and decomposition products, aptly termed smoke by persons skilled in the art, is then cooled, e.g. as by spraying a coolant liquid, such as water into the smoke. The carbon is then recovered from the smoke in the form of exceedingly small particles, ranging in size from about 100 to about 1000 angstroms in diameter.

The exceedingly small particle size just mentioned is one of the characterizing features of furnace carbon blacks. Other characterizing features of these particles generally include an average carbon content of about 95% by weight or higher, an ash content of up to about 1 or 1½% by weight and may include a sulfur content of up to about 1½% by weight. The carbon black may bear on its surface up to about 2% maximum by weight of oxygen as well as small amounts of hydrocarbon materials. The usual carbon to hydrogen ratio in carbon black is about 100 to 1000. Also, furnace carbon black particles commonly tend to associate with one another, forming chain or rod-like aggregations in which adjacent particles cohere to one another with considerable force.

Carbon black has competed with varying degrees of success with various other types of pigments, but there has been one field of application which has been dominated by other pigments; that is in the production of magnetic ink, ferrographic copying pigments, magnetic rubber and plastics compositions and the like. The carbon black of commerce is a non-magnetic material and therefore formulations for the above mentioned products have heretofore required other materials such as oxides and powders of metals possessing magnetic properties.

Oxides and powders of metals possessing magnetic properties have long been used for admixing and blending with waxes, plastics, synthetic and natural rubbers, lacquers, varnishes, paints, papers, inks and other formulations to impart the property of magnetism to the finished product. The prior art is replete with such usages. The magnetic oxides and powders, however, suffer from various disadvantages normally associated with inorganic pigments in general. Among these disadvantages is the great difficulty normally associated with grinding such inorganic pigments to the extremely small particle size required in the preparation of such pigments for use in printing or reproducing inks. Even when sufficiently ground, such pigments generally provide poor wetability and dispersion properties. When incorporated in ink they tend to settle out during storage and therefore can clog the equipment in which the ink is used. Further, these powders and oxides often impart very poor flow and working properties. Even after formulation and application as coatings upon conventional type non-magnetic substrates, these materials often fail to properly adhere. Furthermore, the original color of the formulation is often diluted by the additive oxides and powders and in coating upon a substrate the oxides and powders tend to agglomerate, forming streaks and smudges. Thus, there remains a demand for magnetic pigments of improved properties, especially pigments for magnetic reproducing and printing inks. It is a principal object of the present invention to fulfill the above mentioned demand. Another object is to provide a method for making permeable particles of carbonaceous pigment in particle sizes falling predominantly in the range of $10^2$ to $10^3$ A., said particles containing at least 40% carbon and at least about 5% of metal characterized by the property of being able to induce magnetism in the said particles. A further object is to provide a substance which is able to serve as both black pigment and magnetic component in magnetic compositions such as magnetic inks, rubbers, plastics, waxes, paints and the like. These and other objects and advantages of the invention will be readily appreciated by persons skilled in the art upon consideration of the description of the invention which follows.

In accordance with the invention, permeable or magnetic carbon black is produced by: producing a feedstock solution by bringing together a hydrocarbon oil and an oil-soluble heat-decomposible metallo-organic compound having a metallo moiety which is at least one metal selected from the group consisting of iron, nickel and cobalt; burning a hydrocarbon fuel with oxygen-bearing gas to produce hot combustion gases having a temperature of at least about 2300° F.; injecting said feedstock solution into said burning mixture substantially continuously for decomposing said feedstock into a mixture of decomposition products, including carbon black parties, said metallo-organic compound being present in said feedstock solution in sufficient amount to provide a weight ratio of no less than about 5 and no more than about 50 parts by weight of metal in each 100 parts by weight of said particles; and recovering the resultant metal-bearing particles of carbon black from said mixture.

The recovered material is a permeable pigment which is intensely black at relatively low, e.g. 8%, metal loadings, and somewhat less intensely black as loadings approach 50%. The particles have the property of dispersing quite readily in oily vehicles such as are used in making ink and form stable suspensions therein. Their particle size is sufficiently small so that they require no grinding prior to use as pigments, and they are readily attracted by a magnetic field. That the material is not a mere mixture of carbon particles and discrete particles of magnetic oxides or metal is shown by the fact that substantially all of the particles in a mass of such particles are similarly attracted by a magnet. Examination of the product by water-sedimentation, X-ray diffraction and electron microscopy has failed to uncover any evidence of separate particles of metal or metal oxide. Also, substantial portions of the metal content of the product appear unextractible with mineral acid. Thus, it appears that the metal content of the product is substantially tied up within the carbonaceous particles. Whether the metal is present in the particles as free metal or as some compound has not been definitely established, but there is evidence to support the conclusion that some or all of the metal is converted to an oxide or oxides.

The hydrocarbon oil employed in preparing the feedstock solutions utilized in the method of this invention may be any of the oils commonly employed as feedstocks in the preparation of carbon black. The term "oils" includes not only those hydrocarbon substances that are liquid at ambient temperatures, but also those higher molecular weight hydrocarbons which must be heated before they become fluid. Generally, the feedstocks are characterized by the presence of aromatic or naphthenic or paraffinic compounds or any combination thereof, but especially aromatics. The preferred feedstocks are the viscous, by-product oils from fluid catalytic petroleum cracking processes.

The metallo-organic compounds should be oil soluble. For purposes of the present description and the appended claims, the terminology "oil soluble" is intended to refer not only to true solubility, but also to the ability to colloidally disperse; for example, metal stearates are considered to form a stable system with hydrocarbon oils wherein the stearates are not truly dissolved, but rather they form relatively large micelles which are colloidally dispersed in the oil. The micellular dispersion is stable and, insofar as the process of the invention is concerned, acts like a true solution, so that the distinction between true solutions and stable colloidal dispersions appears more academic than practical insofar as the invention is concerned.

The metallo-organic compound should be heat-decomposable. That is, the compound should give up its metal content in the environment prevailing within the dissociation and combustion zones of a carbon black-producing furnace, e.g. temperatures in excess of about 2300° F. reducing to mildly oxidizing atmosphere and turbulent gaseous suspension medium.

The term "metallo-organic compound" as employed in this specification and in the appended claims refers to a broad class of diverse compounds. The term embraces any organic complex or compound including one or more metal atoms and an organic moiety. The metal atom(s) may be bonded to one or more atoms of carbon and/or other elements in the contemplated compounds. At least one of the metal atoms should be selected from the group consisting of iron, nickel and cobalt. More than one metallic element from the above-mentioned group, or even one or more metallic elements not included in the above group may be present in the compounds. On the other hand, the organic moiety may be any organic radical or radicals which, when combined with a metallo moiety, as above described, meets the oil solubility and heat decomposibility requirements set forth in the preceding paragraphs. Among the wide variety of organic groups which may be mentioned are alkyl, cycloalkyl, alkenyl, cycloalkenyl, aralkyl, aryl, carboxyl and heterocyclic. The preferred class of organic moieties includes the residues of mono- and poly-carboxylic organic acids, such as: aliphatic acids with five to thirty, preferably ten to twenty, carbon atoms; aromatic acids, such as benzoates, naphthoates and higher; cycloparaffinic acids having at least six and preferably about 11 to about 15 carbon atoms; and naphthenic acids. Among the preferred acids are aliphatic acids, such as stearic, oleic, linoleic, octoic, valeric and trimethylacetic. Other preferred acids include tall oil acids and naphthenic acids. In the case of such acids, the metallo-organic compounds take the form of acid salts, in which a replaceable hydrogen atom of the acid is replaced by at least one of the metals in the Iron Group, Group VIII, of the Periodic Chart of the Elements. Thus, the preferred compounds include iron, nickel and cobalt, naphthoates, naphthenates, benzoates, cyclopentanoates, stearates, oleates, octoates, tallates, linoleates, isobutyrates, valeroates and so forth. Carbonyl compounds may also be employed. Exemplary of such class of compounds are phenyl iron dicarbonyl hydride, phenyl cobalt dicarbonyl and phenyl ethyl nickel carbonyl.

It has also been found that the addition, along with the above-described metallo-organic compounds, of an organic acid salt of aluminum or barium, has the effect of definitely enhancing the magnetic properties of the resultant carbon black. The aluminum or barium may be present in the product in a ratio of 0.1 to 1 part per part by weight of the metal derived from the previously mentioned metallo-organic compound. Representative salts include barium naphthenate and aluminum stearate.

In accordance with the invention, a solution of said feedstock and said metallo-organic compound is formed. If necessary, heat may be applied to assist in forming the solution.

The weight of the compound employed may be less than or more than the weight of feedstock, depending in part on the carbon yields available from the feedstock and the compound, the efficiency of carbon formation in the furnace and the percentage of metal desired in the product. The ratio of feedstock to metallo-organic compound required to produce a desired percentage of metal in the carbon black product can be roughly calculated from the carbon content of the feedstock, the molecular and atomic weights of the compound and metal, respectively, and with appropriate, the carbon content of the compound.

Metallo-organic compounds whose organic moieties are predominantly paraffinic or have formula weights substantially lower than the molecular weights of the usual hydrocarbon oil feedstocks, e.g. roughly about 150 to 550, are ordinarily expected to produce small to insignificant yields of carbon under the conditions prevalent in a furnace-type carbon black reactor operated in accordance with the invention. Thus, when the metallo-organic compound is ferrocene (molecular weight 186; formula weight of organic portion 130) or iron naphthenate, or some other compound in which the organic portion has a relatively low formula weight, it is recommended that the carbon in said compound be ignored when making preliminary calculations of the weight ratio of compound to feedstock required to produce a magnetic carbon black of a predetermined metal content. Such preliminary calculations will also be affected by other factors well known to persons skilled in the art. For instance, a significant proportion of the feedstock oil may be burned either intentionally or unintentionally either to produce added heat or on account of the flow characteristics of the reactor, so that perhaps only about 20 to 65% of the carbon content of the oil may be available for carbon formation. For example, the iron content of ferrocene is expressed in terms of its molecular weight divided into irons atomic weight: 55.86/186. If the desired weight ratio of iron to the overallweight of the magnetic carbon black product is R, the required numbers of parts by weight of ferrocene and feedstock oil are X and Y respectively, and the weight proportion of the oil which actually forms carbon is C, then:

(1) $$R = \frac{(55.86/186)X}{CY + (55.86/186)X}$$

Since C can readily be determined for any feedstock oil and R will be whatever desired value is selected by the user of the process, the above equation can readily be solved for $X/Y$ by substituting the proper values for R and C. Since $X/Y$ is by definition the ratio of the parts by weight of ferrocene to feedstock oil, the numerical value thus obtained may be employed directly to find a preliminary operating ratio for producing a magnetic carbon black product with a metal content of R.

On the other hand, if the organic moiety of the metallo-organic compound were to have a formula weight comparable to that of the usual feedstock oils, then it would not be considered advisable to ignore the carbon content in calculations of the above type. Instead, it is believed good practice to add to the denominator of the right-hand member of the above equation an expression for the carbon content of the compound. The general equation for use with compounds in which the carbon content might be expected to produce significant yield is as follows:

(2)
$$R = \frac{\left(\frac{\text{formula wt. metal}}{\text{Mol. wt. met.} - \text{org. comp'd}}\right)X}{CY + \left(\frac{\text{formula wt. carbon} + \text{formula wt. metal}}{\text{Mol.wt. met.} - \text{org. comp'd}}\right)X}$$

X being the parts by weight of the metallo-organic compound and R, Y and C having the same significance as in Equation 1, above.

Upon actual trial of mixtures of metallo-organic compounds and feedstock oils containing ratios of compound and oil computed in accordance with the above, and upon analysis of the resultant product for iron content, it may be found that the weight of metal in said product may vary upwardly or downwardly from R, depending on the velocity and turbulence of flow of the gases in the furnace. Nevertheless with the benefit of the initial theoretical calculation of the ratio of X to Y and the experience gained from a trial run with feedstock and metallo-organic compound in amounts or at rates conforming to said ratio, one skilled in the art will readily know whether to increase or decrease the ratio in order to obtain the desired product. Then, selection of the ratio of X to Y which is needed in practice to produce the desired product may be accomplished through the simple process of a few additional test runs and analyses operating at suitably altered values of $X/Y$.

The ratio of metallo-organic compound to feedstock should be such as to provide a minimum content of at least about 5% by weight, based on the weight of the entire product, of iron, nickel or cobalt, or a mixture thereof, calculated as metal. Lower percentages of metal produce a product of insignificant permeability and coercivity in respect to making ink and magnetic molding compounds. Preferably, the percentage of the mentioned metals in the product should be in the range of about 10% to about 35%; and, more preferably, the percentage of the mentioned metals should be in the range of about 15 to about 25%, calculated as metal. The percentage of the mentioned metals in the magnetic carbon black product of the invention should not exceed about 50%, calculated as metal. Higher percentages result in an unhomogeneous product of inferior tinting strength. The product produced in accordance with the invention therefore contains a minimum of about 40% carbon by weight, the carbon content ranging as high as about 90% when minimum amounts of metal and impurities are present. Preferably, the product contains about 60 to about 80% carbon.

The preparation of magnetic carbon black in accordance with the invention may be carried out in any furnace type carbon black reactor and accompanying collection system. A wide variety of such reactors and systems are known to persons skilled in the art, and the invention may be practiced in substantially all of them. Therefore, they will not therefore be described herein. For the purposes of practicing the invention, the reactors and collection systems may be operated in the same manner as when producing a non-magnetic carbon black product, except that the feedstock will be a mixture of the usual feedstock oil and one or more of the aforementioned metallo-organic compounds.

The following non-limiting examples, in which all parts are by weight unless the contrary is indicated, illustrate the present invention. In each, natural gas and air are employed as the combustible mixture. Feed rates of the liquid hydrocarbon feedstock and of the gas and air are such as to provide generally complete combustion of the fuel gas while maintaining a temperature of about 2600° F. to 3300° F. in the reaction chamber. The reactor employed in these tests and the general method of introducing feed materials thereto is substantially that described by U.S. Patent 3,060,003, though it is apparent that the present invention is applicable to essentially any type of reactor. The carbon blacks are recovered from the effluent by standard means forming no part of this invention, such methods being fully described in the art.

The liquid hydrocarbon feedstock employed in the example is of the following approximate composition:

| | |
|---|---|
| API gravity | 5.0 |
| Pour point, ° F. | 32 |
| Flash point, ° F. | 188 |
| Saybolt viscosity, SSU at 210° F. | 43.7 |
| Asphaltenes, percent | 1.71 |
| Aromatics, percent | 73.09 |
| Conradson carbon residue, percent | 7.12 |
| Sulfur, percent | 1.09 |
| Ash, percent | 0.019 |
| Correlation index | 106.49 |
| Molecular weight (calculated UOP method) | 275 |

The feedstock distills as follows:

| Distillation: | ° F.—760 mm. |
|---|---|
| IBP | 289 |
| Percent: | |
| 5 | 569 |
| 10 | 623 |
| 20 | 681 |
| 30 | 713 |
| 40 | 738 |
| 50 | 767 |
| 60 | 801 |
| 70 | 835 |
| 80 | 883 |
| 90 | 949 |

Example I

The matallo-organic compound for this example is "Iron Naphthenate," a commercially available product sold by Witco Chemical Corporation and containing iron salts of a mixture of naphthenic acids in a hydrocarbon vehicle or base. The material has an iron analysis of approximately 6%. Equal parts of the iron naphthenate and the above-described feedstock oil are injected axially into the upstream end of the above-described reactor at the rate (total) of 3.95 gallons per hour. Simultaneously, a combustible mixture of 320 s.c.f.h. of natural gas and 4800 s.c.f.h. of air are injected into the reactor and are burned therein, producing hot combustion gases. The mixture of feedstock oil and iron naphthenate rapidly mixes with and is dispersed in the intensely hot and turbulent gases, forming a carbon black product which is then quenched and recovered in the usual manner.

Upon testing, the particulate carbon black product is found to possess an unusual jetness and a surprising facility for dispersing in oil and water. The particle size of the black is found to be in the normal range for carbon black particles. Substantially all of the particles in a given sample of product are attracted by a common horse-shoe magnet. No effect is noted when ordinary carbon black is subjected to the field of the magnet.

Example II

To illustrate the preparation of magnetic ink, magnetic carbon black like that produced in Example I is blended into the following formulation and homogenized:

|  | Percent |
|---|---|
| Magnetic carbon black | 65 |
| Fumarated rosin dissolved in diethylene glycol in a ratio of 60:40 | 20 |
| Triethanol amine mixed with oleic acid in a ratio of 30:70 (as stabilizer) | 3 |
| Wax-rosin mixture diluted with octylene glycol | 5 |
| Zein resin dissolved in diethylene glycol | 7 |

In the preparation of the above formulation, it is noted that the magnetic carbon black behaves substantially as a normal ink grade carbon black pigment, readily wetting and dispersing uniformly throughout the formulation. Indicia printed on standard check paper with the above ink are found to possess good magnetic properties.

Example III

The procedure of Example I is repeated, except that instead of feeding equal parts iron naphthenate and feedstock oil to the reactor, a mixture of feedstock and ferric stearate in the ratio of 100 to 500 is employed. A particulate magnetic carbon black product is formed having physical characteristics that are similar to the product of Example I.

Example IV

The procedure of Example I is repeated except that 300 parts barium stearate, 300 parts feedstock oil and 300 parts of the above-described iron naphthenate are employed. A product with superior magnetic properties is obtained.

Example V

The procedure of Example I is repeated, substituting first cobalt naphthenate, then nickel naphthenate for the iron naphthenate. Similar results are obtained.

I claim:

1. A method of producing magnetically permeable carbon black, comprising: producing a feedstock solution by bringing together a hydrocarbon oil, an oil-soluble heat-decomposible metallo-organic compound comprising an organic moiety and at least one metal selected from a first group consisting of iron, nickel and cobalt and mixtures thereof, and an organic acid salt of a metal from a second group consisting of barium and aluminum; burning a hydrocarbon fuel with oxygen-bearing gas to produce hot combustion gases having a temperature of at least about 2300° F.; injecting said feedstock solution into said burning mixture substantially continuously for decomposing said feedback solution into a mixture of decomposition products, including metal-bearing carbon black particles; said metallo-organic compound being present in said feedstock solution in sufficient amount to produce a weight ratio of no less than about 5 and no more than about 50 parts by weight of said first group metal per 100 parts of said particles; said organic acid salt being present in said feedstock solution in sufficient amount to provide a weight ratio of about 0.1 to 1 part by weight of said second group metal per part by weight of said first group metal; the quantity of said metallo-organic compound and said organic acid salt introduced into said feedback solution being such as to provide in the resultant product at least 40% by weight of carbon; and recovering the resultant product.

2. A method in accordance with claim 1 wherein said second group metal is barium.

3. A method in accordance with claim 1 wherein said second group metal is aluminum.

4. A method in accordance with claim 1 wherein the quantity of said metallo-organic compound and said organic acid salt are such as to provide in the resultant product about 60% to about 80% carbon by weight.

5. A method in accordance with claim 1 wherein the quantity of said metallo-organic compound and said organic acid salt are such as to provide in the resultant product about 90% carbon by weight.

References Cited

UNITED STATES PATENTS

| 2,356,471 | 8/1944 | Rehner | 23—209.8 |
| 2,914,418 | 11/1959 | Eastman | 23—209.2 |
| 3,213,026 | 10/1965 | Merrill et al. | 252—62.55 |

FOREIGN PATENTS

| 1,377,547 | 9/1964 | France. |

TOBIAS E. LEVOW, *Primary Examiner.*

R. D. EDMONDS, *Assistant Examiner.*

U.S. Cl. X.R.

23—209.4, 209.6, 209.8; 106—307; 252—62.55